United States Patent [19]

Stalter et al.

[11] 4,349,406
[45] Sep. 14, 1982

[54] TIRE BUILDING MACHINE DRUM

[75] Inventors: Joseph F. Stalter, Mogadore, Ohio; Gilbert A. Felten, Kehlen, Luxembourg

[73] Assignee: The Goodyear Tire & Rubber Company, Akron, Ohio

[21] Appl. No.: 204,322

[22] Filed: Nov. 5, 1980

[51] Int. Cl.³ .......................................... B29H 17/16
[52] U.S. Cl. ..................................... 156/416; 156/417
[58] Field of Search ................ 156/414, 415, 416, 417

[56] References Cited

U.S. PATENT DOCUMENTS

| | | | |
|---|---|---|---|
| 2,655,977 | 10/1953 | Hodgkins | 154/9 |
| 3,188,260 | 6/1965 | Nebout | 156/416 |
| 3,405,023 | 10/1968 | Eckenwiler et al. | 156/415 |
| 3,698,987 | 10/1972 | Woodhall | 156/401 |
| 3,778,326 | 12/1973 | Gazuit | 156/417 |
| 3,787,262 | 1/1974 | Appleby et al. | 156/417 X |
| 3,867,229 | 2/1975 | Marra | 156/417 |

FOREIGN PATENT DOCUMENTS 851153  9/1970  Canada ................. 154/19.8

*Primary Examiner*—Edward C. Kimlin
*Assistant Examiner*—Lois E. Boland
*Attorney, Agent, or Firm*—Frederick K. Lacher; T. P. Lewandowski

[57] ABSTRACT

A contractible tire building drum having segmental cylindrical shoulder rings with flanges at the ends and a stretchable bladder positioned over and between the shoulder rings. Each of the shoulder rings has a primary set of segments and a secondary set of segments alternately spaced around the ring. The primary and secondary sets of segments are retractable from positions in the cylindrical shoulder ring to a nested position radially inward. Guide means are provided to displace the secondary segments in an axial direction during retraction of the segments so that the secondary segments are axially displaced from the primary segments with the flanges of the secondary segments overlapping the flanges of the primary segments.

14 Claims, 3 Drawing Figures

TIRE BUILDING MACHINE DRUM

This invention relates to drums for tire building machines and especially to a positive crown drum which has flanged shoulder rings and a stretchable bladder. The drum is expandable and contractible to facilitate placing a tire band over the drum and removal of the built and shaped tire from the drum. The shoulder ring flanges are needed for seating of the beads; however, when the segments are retracted the flanges have made it difficult to contract the drum into a compact space. In the past, half of the segments of the drum have been first moved axially of the drum and then retracted to prevent interference with the flanges of the other segments. Separate additional actuating apparatus was required for moving the first group of segments axially and this required additional controls as well as air seals to prevent leakage of air from within the bladder.

Another problem has been maintaining alignment of the segments as they are retracted and extended so that they will occupy a minimum space in the contracted condition of the drum and fit together to make a continuous cylindrical shoulder of the drum in the expanded condition.

The present invention is directed to a drum wherein a primary set of circumferentially spaced shoulder ring segments are moved radially during expansion and contraction of the drum. A secondary set of segments is positioned between the segments of the primary set and the secondary segments are axially displaced from the primary segments during contraction of the drum. The primary set of segments are mounted on radially movable pistons and the secondary set of segments are mounted on pistons movable in cylinders inclined axially away from the ends of the drum. The pistons carrying both sets of segments are prevented from rotating relative to the cylinders and thereby maintain the segments in alingment for nesting in the contracted condition of the drum. The extension of the pistons is also limited so that the segments will fit in a continuous ring in the expanded condition.

In accordance with an aspect of the invention, a contractible tire building drum is provided, rotatable about a drum axis and having a pair of shoulder rings connected by an inflatable bladder with each of the shoulder rings comprising a segmental generally cylindrical ring member having a radially inwardly extending flanged portion at one edge, the ring member having a primary set of primary segments, a secondary set of secondary segments, the primary segments being positioned circumferentially between the secondary segments, first means for retracting and extending the primary segments between an expanded generally cylindrical condition and a contracted nested condition of the ring member, second means for retracting and extending the secondary segments between the cylindrical condition and the nested condition of the ring member, and guide means for displacing the secondary segments in an axial direction during contraction of the ring member so that the secondary segments are axially offset from the primary segments in the contracted condition of the ring member and the flanged portions of the primary segments overlap the flanged portions of the secondary segments in the contracted nested condition of the ring member.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 1 is a fragmentary side elevational view partly in section and taken along line 1—1 of FIG. 2 of a preferred form of tire building machine drum showing the left-hand side of the drum in the contracted condition and the right-hand side of the drum in the expanded condition. The section for the upper half of the drum is taken along a plane through the axes of two corresponding primary segment cylinders and the section for the lower half of the drum is taken along a plane through the axes of two corresponding secondary segment cylinders.

Figure 1:
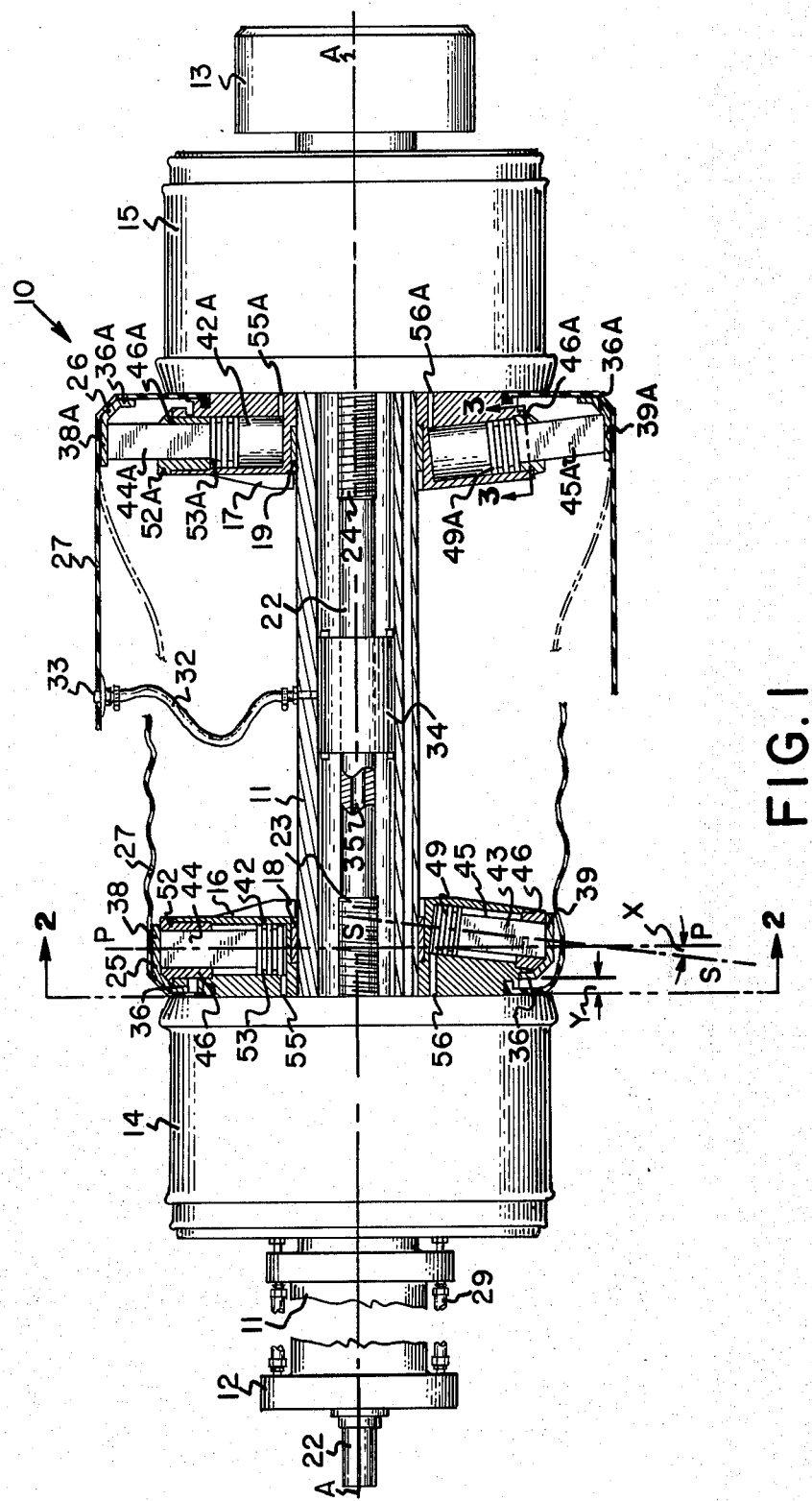

Referring to FIG. 1, a contractible tire building drum 10 which is especially adapted for building radial truck tires is shown. The drum 10 is rotatable about a drum axis A—A on a hollow shaft 11 extending from a flanged end 12 at the inboard end to a spindle end cap 13 at the outboard end. The flanged end 12 is bolted to a drive shaft (not shown) and the spindle end cap 13 is adapted to engage a spindle on an outboard carriage assembly (not shown). The inboard and outboard ends of the drum 10 carry double bladder turnup assemblies 14 and 15 including expandable bead locks of a construction familiar to those skilled in the art.

Between the double bladder turnup assemblies 14 and 15 are portions of a left-hand hub 16 and a right-hand hub 17 which also extend within the double bladder turnup assemblies and are axially slidable on the shaft 11. The left-hand hub 16 is supported in sealing engagement with the shaft 11 by a bushing 18 and by at least one other bushing (not shown) inboard of bushing 18. The right-hand hub 17 is supported by a bushing 19 in sealing engagement with the shaft 11 and by at least one other bushing (not shown) outboard of bushing 19.

A screw 22 is rotatably mounted within the hollow shaft 11 and has left screw threads 23 and right screw threads 24 engageable with threaded collars (not shown) connected to the left-hand hub 16 and right-hand hub 17, respectively. The left screw threads 23 and right screw threads 24 are of a different hand and therefore upon rotation of the screw 22 move the left-hand hub 16 and right-hand hub 17 together or apart.

Figure 2:
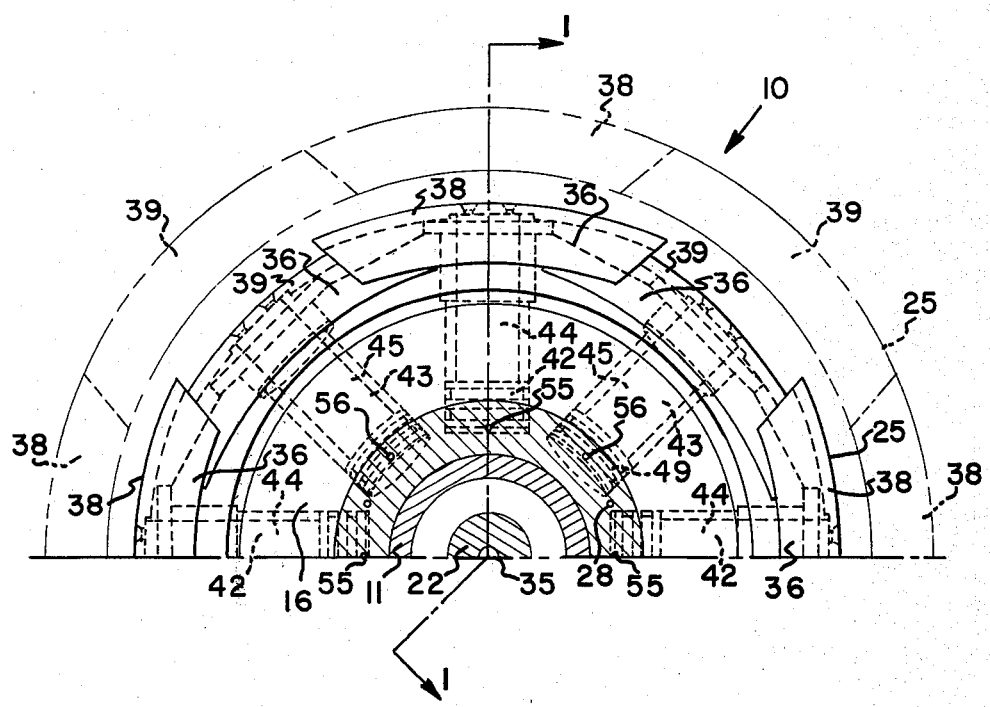
FIG. 2 is an enlarged fragmentary end elevation of the upper half of the drum with the bladder removed, taken along line 2—2 of FIG. 1 showing the shoulder segments with the flanges overlapping in the retracted position in full lines and showing the shoulder segments joined in ring shape in the expanded condition in phantom lines.

The drum 10 has a pair of shoulder rings 25 and 26 shown in FIGS. 1 and 2. An inflatable bladder 27 extends over the shoulder rings 25 and 26 and is clamped between the double bladder turnup assemblies 14 and 15 and the hubs 16 and 17 in sealing engagement. The bladder 27 may be of resilient material such as rubber and may be reinforced by suitable reinforcing fabric such as a double knit textile material for limiting the expansion of the bladder. An inner supply passage 28 in the left-hand hub 16 may be connected to an air hose 29 which is in communication with a suitable air pressure supply source and controls for inflating and deflating the bladder 27.

Tubing 32 between a valve core housing 33 in the bladder 27 and a rotary union 34 is in communication with a central passage 35 leading to the left end of the screw 22 which is connected to a source of air pressure and controls for inflating the tire after it is built on the bladder 27 so that a belt and tread may be applied in the toroidal shape of the tire.

Because the shoulder ring 25 and its actuating mechanism is a reverse copy of the shoulder ring 26 and its actuating mechanism, the following description of the shoulder ring 25 will also apply to the description of shoulder ring 26. Similar parts for shoulder ring 26 and its actuating mechanism will be identified on the drawings by the suffix "a" such as flanged portions 36 and 36a at the outboard side of shoulder rings 25 and 26, respectively.

Referring to FIG. 2, the shoulder ring 25 is shown in phantom lines in the expanded, generally cylindrical, condition and in full lines in the contracted, nested condition. The shoulder ring 25 has a primary set of primary segments 38 and a secondary set of secondary segments 39. The primary segments 38 are positioned circumferentially between the secondary segments 39 to form a segmental, generally cylindrical, ring member. In this particular embodiment there are four primary segments 38 and four secondary segments 39. As shown in FIGS. 1 and 2, the primary segments 38 are supported and moved in a radial direction by primary piston and cylinder assemblies 42 spaced at ninety degree intervals around the left-hand hub 16. The cylinder axes for the primary piston and cylinder assemblies 42 extend radially outward from the axis A—A of the drum 10 and are positioned in a plane P—P generally perpendicular to the axis A—A.

The secondary segments 39 are supported and moved in a radial direction at an angle to the plane P—P by secondary piston and cylinder assemblies 43 positioned at ninety degree intervals around the left-hand hub 16 and spaced at forty-five degree intervals from the primary piston and cylinder assemblies 42. The secondary piston and cylinder assemblies 43 serve as guide means for the secondary segments 39 to restrict the movement of the secondary segments to directions diverging from the direction of movement of the primary segments 38 during the retraction of the secondary segments.

As shown in FIG. 1, the cylinder axis S—S of one of the secondary piston and cylinder assemblies 43 is at an angle X to the plane P—P perpendicular to the axis A—A of the drum 10 and this angle may be in the range of from about two degrees to ten degrees. In the particular embodiment shown, the angle X is about seven and one-half degrees. At the angle X, the secondary segments 39 are axially offset from the primary segments 38 in the contracted condition of the shoulder ring 25 in an amount Y which is equal to or greater than the flange thickness of the flanged portion 36. With this construction, segments of the flanged portion 36 on the primary segments 38 overlap segments of the flanged portion on the secondary segments 39 in the nested condition so that the shoulder ring 25 will have a reduced diameter and facilitate mounting of a tire band over the drum 10 and removing a finished tire from the drum.

Figure 3:
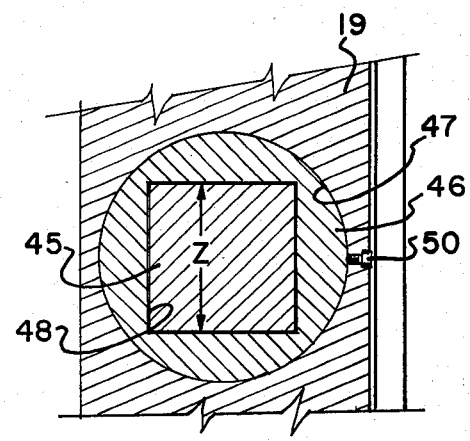
FIG. 3 is a further enlarged fragmentary sectional view taken along the line 3—3 of FIG. 1 showing the square opening in one of the bushings and the square cross section of the corresponding matching piston rod for maintaining alignment of the shoulder segments.

The primary segments 38 are fastened to primary piston rods 44 by suitable fasteners such as rivets or screws and the secondary segments 39 are fastened to secondary piston rods 45 by suitable fasteners such as rivets or screws. As shown in FIG. 3, the secondary piston rods 45 are slidably mounted in bushings 46 which are nonrotatably fastened to cylinders 47 of the secondary piston and cylinder assemblies 43 in the hubs 16 and 17. The piston rods 45 are noncylindrical for sliding engagement with corresponding noncylindrical openings 48 in the bushings 46 to maintain the segments 39 in the desired position without rotation during extension and retraction. In this particular embodiment as shown in FIG. 3, the piston rods 45 are square in cross section and the openings 48 in the bushings 46 have a corresponding matching square cross section.

The bushings 46 are fastened in the cylinders 47 as by screws 50 to limit the extension of the secondary segments 39. As shown in the drawings, pistons 49 of the secondary piston and cylinder assemblies 43 have a greater diameter than the minimum cross-sectional dimension Z of the openings 48 in the bushings 46 and this serves to locate the secondary segments 39 in the shoulder ring 25 at the desired diameter in the expanded condition.

The primary piston and cylinder assemblies 42 also have bushings 52 of a similar construction to the bushings 46 and the piston rods 44 have square cross sections for sliding engagement with corresponding matching square openings in the bushings 52. Also pistons 53 of the primary piston and cylinder assemblies 42 have diameters which are greater than the minimum cross-sectional dimension of the openings in the bushings 52 as described hereinabove for the secondary piston and cylinder assemblies 43 so as to locate the primary segments 38 in the shoulder rings 25 at the desired diameter in the expanded condition.

The piston and cylinder assemblies 42 and 43 are actuated by air or vacuum and are in communication with a suitable source of vacuum and air supply. Suitable controls are provided for operating the primary piston and cylinder assemblies 42 separately from the secondary piston and cylinder assemblies 43. In this embodiment, the vacuum is applied to the secondary piston and cylinder assemblies 43 to move the secondary segments 39 to the retracted position as shown in FIG. 2 and then vacuum is applied to the primary piston and cylinder assemblies 42 to move them to the retracted positions shown in FIGS. 1 and 2.

In operation of the tire building drum 10 at the beginning of the tire building process, the primary and secondary piston and cylinder assemblies 42 and 43 are in the retracted position as shown in the left side of FIG. 1 with the inflatable bladder 27 in the relaxed minimum diameter position. The outboard carriage assembly is spaced from the spindle end cap 13 and beads are placed over the bead rings and the band is placed on the collapsed drum and centered. The outboard carriage is then moved into the support position and engages the spindle end cap 13. At this time the operator may lift the band and actuate suitable controls to communicate air under pressure to the primary and secondary piston and cylinder assemblies 42 and 43 to extend the primary segments 38 and the secondary segments 39 to the expanded position of the drum 10, shown in FIG. 1.

Air and vacuum is communicated to the cylinders of the primary piston and cylinder assemblies 42 through passages 55 in the hub 16. Air and vacuum is communicated to the cylinders of the secondary piston and cylinder assemblies 43 through passages 56 in the hub 16. Suitable controls are provided for communicating vacuum and air pressure to the cylinders of the primary and secondary piston and cylinder assemblies 42 and 43 so that the expansion and contraction of the primary and secondary segments 38 and 39 may be in sequence. The extension and retraction of the primary segments 38 is done simultaneously and the retraction and extension of the secondary segments is done simultaneously.

During the building operation, the inflatable bladder 27 is extended from the position shown in dot-dash lines in the right-hand side of FIG. 1 to the position shown in full lines by inflating the bladder through passage 28. This provides a surface for supporting the tire band during building of the tire carcass. When the tire carcass has been built on the drum 10 the hubs 16 and 17 are moved together by rotation of the screw 22 and the tire is inflated by air pressure communicated to the tire through passage 35 in the screw and through the tubing 32 and valve core housing 33. The tire carcass inflates into end bells (not shown) to form the shaped tire. At this time the breakers and tread are applied in sequence to the carcass over the end bells to complete the tire. To remove the tire the air pressure is released from the tire and vacuum is applied to the cylinders of the secondary piston and cylinder assemblies 43 moving the secondary segments 39 to the position shown at the left side of FIG. 1. Then the vacuum is applied to the primary piston and cylinder assemblies 42 moving the primary segments 38 to the position shown in the left-hand side of FIG. 1 and in full lines in FIG. 2. The tire may then be removed from the tire building drum 10.

While a certain representative embodiment and details have been shown for the purpose of illustrating the invention, it will be apparent to those skilled in the art that various changes and modifications may be made therein without departing from the spirit or scope of the invention.

We claim:

1. A contractible tire building drum rotatable about a drum axis and having a pair of shoulder rings connected by an inflatable bladder with each of said shoulder rings comprising a segmental generally cylindrical ring member having a radially inwardly extending flanged portion at one edge, said ring member having a primary set of primary segments, a secondary set of secondary segments, said primary segments being positioned circumferentially between said secondary segments, first means for retracting and extending said primary segments between an expanded generally cylindrical condition and a contracted nested condition of said ring member, second means for retracting and extending said secondary segments between said cylindrical condition and said nested condition of said ring member, and guide means for displacing said secondary segments in an axial direction during contraction of said ring member so that said secondary segments are axially offset from said primary segments in the contracted condition of said ring member and the flanged portions of said primary segments overlap the flanged portions of said secondary segments in said contracted nested condition of said ring member.

2. A tire building drum in accordance with claim 1 wherein said secondary segments are displaced axially during retraction and said primary segments are movable in a direction perpendicular to said drum axis.

3. A tire building drum in accordance with claim 1 wherein said guide means limits the movement of said secondary segments to paths diverging from paths of said primary segments during retraction of said secondary segments.

4. A tire building drum in accordance with claim 1 wherein said second means for retracting and extending said secondary segments is operable before said first means so that said secondary segments are moved first to the retracted position and then said primary segments are moved to the retracted position for nesting of said primary segments in radially overlapping relationship with said secondary segments.

5. A tire building drum in accordance with claim 2 wherein the retracting movements of said secondary segments are in paths at an angle to said direction perpendicular to said axis.

6. A tire building drum in accordance with claim 1 wherein said first and second means for retracting and extending said segments are piston cylinder assemblies with cylinder axes of said assemblies for said first means extending radially outward from said axis of the drum and being positioned in a plane generally perpendicular to said axis, and said cylinder axes of said assemblies for said second means being at an angle to said plane containing said cylinder axes of said first means.

7. A tire building drum in accordance with claim 6 wherein said angle is in the range of from about 2 degrees to 10 degrees.

8. A tire building drum in accordance with claim 1 wherein said flanged portion has a flange thickness and said secondary segments are axially offset from said primary segments in the contracted condition of said ring member in an amount equal to or greater than said flange thickness.

9. A tire building drum in accordance with claim 6 wherein said segments are mounted on piston rods of said piston-cylinder assemblies and said piston rods are slidably movable in bushing members in said cylinders of said first and second means for retracting and extending said segments, and said piston rods being noncylindrical for sliding engagement with corresponding matching noncylindrical openings in said bushings to maintain said segments in the desired position without rotation during extension and retraction of said segments.

10. A tire building drum in accordance with claim 9 wherein said cross sections of said piston rods are square and said openings in said bushings have a corresponding matching square cross section.

11. A tire building drum in accordance with claim 10 wherein pistons of said assemblies have a greater diameter than the minimum cross-sectional dimension of the openings in said bushings to limit the extension of said pistons in said cylinders and locate said segments radially in the ring of said rim in the expanded condition.

12. A tire building drum in accordance with claim 1 wherein said flanged portion is at an outer edge of said drum and said secondary segments are axially offset from said primary segments in a direction away from said outer edge of said drum.

13. A tire building drum in accordance with claim 12 wherein said first means for retracting and extending said primary segments of said shoulder ring member of each of said shoulder rings are operated simultaneously and said second means for retracting and extending said secondary segments of said shoulder ring member of each of said shoulder rings are operated simultaneously for simultaneous expansion and contraction of said shoulder rings at each end of said drum.

14. A tire building drum in accordance with claim 13 including means to inflate said bladder to provide a surface for supporting a tire band during building of the tire carcass, means for axially moving said shoulder rings together and means for inflating a tire on said drum to a toric shape for applying a belt and tread.

* * * * *